United States Patent
Lin et al.

(10) Patent No.: US 10,789,719 B2
(45) Date of Patent: Sep. 29, 2020

(54) METHOD AND APPARATUS FOR DETECTION OF FALSE ALARM OBSTACLE

(71) Applicant: CLOUDMINDS (SHENZHEN) ROBOTICS SYSTEMS CO., LTD., Shenzhen, Guangdong (CN)

(72) Inventors: Yimin Lin, Beijing (CN); Rumin Zhang, Beijing (CN); Shiguo Lian, Beijing (CN)

(73) Assignee: CLOUDMINDS (SHENZHEN) ROBOTICS SYSTEMS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/452,608

(22) Filed: Jun. 26, 2019

(65) Prior Publication Data
US 2019/0318487 A1    Oct. 17, 2019

Related U.S. Application Data

(63) Continuation of application No. PCT/CN2016/112632, filed on Dec. 28, 2016.

(51) Int. Cl.
    *G06K 9/00*     (2006.01)
    *G06T 7/285*    (2017.01)
    (Continued)

(52) U.S. Cl.
    CPC .......... *G06T 7/285* (2017.01); *G06K 9/00771* (2013.01); *G06T 7/13* (2017.01);
    (Continued)

(58) Field of Classification Search
    CPC ................. G06K 9/00; G06K 9/00771; G06T 2207/30232; G06T 7/13; G06T 7/285;
    (Continued)

(56) References Cited

U.S. PATENT DOCUMENTS 6,226,396 B1 *   5/2001   Marugame ......... G06K 9/00228
                                                    382/154
9,792,491 B1 *  10/2017   Ramaswamy ............ G06T 7/20
                          (Continued)

FOREIGN PATENT DOCUMENTS

CN          103413313 A       11/2013
CN          104318206 A        1/2015
                   (Continued)

OTHER PUBLICATIONS

Bae, Kyung-Hoon, Jung-Sik Koo, and Eun-Soo Kim. "A new stereo object tracking system using disparity motion vector." Optics Communications 221.1-3 (2003): 23-35. (Year: 2003).*

*Primary Examiner* — Avinash Yentrapati
(74) *Attorney, Agent, or Firm* — Volpe and Koenig, P.C.

(57) ABSTRACT

The embodiment of the present application provides a method and apparatus for detection of false alarm obstacle, and relates to the field of identification and detection technology, in order to improve accuracy for the obstacle detection. The method includes: obtaining a first view at a moment t and a second view at a moment t−1, collected by a camera; determining location information of the same obstacle to be detected in the first view and the second view; determining motion information of the camera from moment t−1 to the moment t; judging whether the location information of the same obstacle to be detected in two views being matched with the motion information of the camera; and if not, judging the obstacle to be detected as a false alarm obstacle. The embodiment of the present application is applied to obstacle detection.

6 Claims, 8 Drawing Sheets

(51) Int. Cl.

| | |
|---|---|
| *G06T 7/00* | (2017.01) |
| *G06T 7/13* | (2017.01) |
| *H04N 13/204* | (2018.01) |
| *G08B 29/18* | (2006.01) |
| *H04N 7/18* | (2006.01) |

(52) U.S. Cl.
CPC .............. *G06T 7/97* (2017.01); *G08B 29/185* (2013.01); *H04N 7/183* (2013.01); *H04N 13/204* (2018.05); *G06T 2207/30232* (2013.01)

(58) Field of Classification Search
CPC ...... G06T 7/97; G08B 29/185; H04N 13/204; H04N 7/183
See application file for complete search history.

(56) References Cited

U.S. PATENT DOCUMENTS

| | | | | |
|---|---|---|---|---|
| 2004/0045339 | A1* | 3/2004 | Nichani | G06K 9/00771 73/1.01 |
| 2006/0078162 | A1* | 4/2006 | Wonneberger | H04N 5/23254 382/103 |
| 2008/0273751 | A1* | 11/2008 | Yuan | G06T 7/579 382/103 |
| 2010/0013917 | A1* | 1/2010 | Hanna | G08B 13/19608 348/143 |
| 2011/0169917 | A1* | 7/2011 | Stephen | G06K 9/00785 348/46 |
| 2013/0088343 | A1* | 4/2013 | Deigmoller | G06T 7/215 340/436 |
| 2013/0128001 | A1* | 5/2013 | You | G06K 9/00208 348/47 |
| 2014/0153784 | A1* | 6/2014 | Gandolph | G06T 7/593 382/107 |
| 2016/0019683 | A1* | 1/2016 | You | G06T 7/74 382/103 |
| 2017/0140231 | A1* | 5/2017 | Chen | G06K 9/623 |
| 2018/0217255 | A1* | 8/2018 | Kim | G01S 13/931 |
| 2019/0012798 | A1* | 1/2019 | Amano | G06T 7/11 |

FOREIGN PATENT DOCUMENTS

| | | |
|---|---|---|
| CN | 104965202 A | 10/2015 |
| CN | 105718888 A | 6/2016 |
| CN | 105893928 A | 8/2016 |
| JP | 2005-175603 A | 6/2005 |

* cited by examiner

Fig. 6 setting a disparity value beyond the sub-disparity value range in the target disparity map as a first disparity threshold, so as to generate a sub-disparity map of the target disparity map, based on a sub-disparity value range setting a disparity value beyond the sub-disparity value range in the target disparity map as a first disparity threshold, so as to generate a sub-disparity map of the target disparity map, based on a sub-disparity value range — S201 performing contour detection on the sub-disparity map to obtain contour information of the obstacle in the sub-disparity map — S202 determining the location of the obstacle according to the contour information of the obstacle in the sub-disparity map and the disparity value of each pixel point in the sub-disparity map — S203

METHOD AND APPARATUS FOR DETECTION OF FALSE ALARM OBSTACLE

CROSS-REFERENCE TO RELATED APPLICATIONS

This application is a continuation application under 35 U.S.C. § 120 of PCT application No. PCT/CN2016/112632 filed on Dec. 28, 2016, the contents of which are incorporated herein by reference.

FIELD OF THE INVENTION

The present application relates to the field of identification and detection technology, and in particular, to a method and apparatus for detection of false alarm obstacle.

BACKGROUND OF THE INVENTION

At present, obstacle detection is one of the most important parts in any technical field of unmanned driving, aided driving, drone navigation, blind guiding, and intelligent robots. For example, intelligent robots or unmanned vehicles and the like perform autonomous navigation in unknown environments to sense the surrounding environments, and a system is needed to provide information such as obstacles and roads in the environments. In recent years, as the rapid development of the computer image processing technology, the application of visual sensors in obstacle detection has been paid more and more attention. Therefore, at the current, the mainstream method for obstacle detection is a method for obstacle detection based on visual sensors. However, due to the influence of noise, errors and the like, the obstacle detection result is not accurate enough.

SUMMARY OF THE INVENTION

The embodiment of the present application provides a method and apparatus for detection of false alarm obstacle, in order to improve the accuracy of obstacle detection.

To achieve the above objective, the embodiment of the present application adopts the following technical solutions:

In a first aspect, a method for detection of false alarm obstacle is provided, including:
obtaining a first view at a moment t and a second view at a moment t−1, collected by a camera;
determining location information of the same obstacle to be detected in the first view and the second view;
determining motion information of the camera from moment t−1 to the moment t;
judging whether the location information of the same obstacle to be detected in two views being matched with the motion information of the camera; and
if not, judging the obstacle to be detected as a false alarm obstacle.

In a second aspect, an apparatus for detection of false alarm obstacle is provided, including:
an obtaining module, configured to obtain a first view at a moment t and a second view at a moment t−1, collected by a camera;
a determining module, configured to determine location information of the same obstacle to be detected in the first view and the second view obtained by the obtaining module;
the determining module is further configured to determine motion information of the camera from moment t−1 to the moment t; and a judging module, configured to judge whether the location information of the same obstacle to be detected in two views obtained by the determining module being matched with the motion information of the camera, and if not, judge the obstacle to be detected as a false alarm obstacle.

In a third aspect, an electronic device is provided, and the structure of the electronic device includes a processor, configured to support the apparatus to execute corresponding functions in the above method. The apparatus may also include a memory, which is coupled with the processor, storing computer software codes used by the above apparatus for detection of false alarm obstacle, and including a program designed to execute the above method.

In a fourth aspect, a computer storage medium is provided, for storing a computer software instruction used by an apparatus for detection of false alarm obstacle and containing program codes designed to execute the above method.

In a fifth aspect, a computer program is provided, which is capable of being directly loaded in an internal memory of a computer and containing software codes, and the computer program may implement the above method after being loaded and executed by the computer.

In a sixth aspect, a robot is provided, including the electronic device according to the third aspect.

In the prior art, due to the influence of noise, errors and the like, false factors, that is, false obstacles, exist in the obstacles detected in an obstacle detection process. In order to detect the false obstacles, according to the solution provided by the present application, the first view at the moment t and the second view at the moment t−1, collected by the camera, are obtained, then the location information of the same obstacle to be detected in the first view and the second view is determined, the motion information of the camera from moment t−1 to the moment t is also determined, then whether the location information of the same obstacle to be detected in two views being matched with the motion information of the camera is judged so as to judge whether the obstacle to be detected is the false alarm obstacle, and if the location information of the obstacle to be detected in the two views being not matched with the motion information of the camera, the obstacle to be detected is judged as the false alarm obstacle, therefore the false alarm obstacle may be eliminated, and the accuracy of obstacle detection is ensured.

BRIEF DESCRIPTION OF THE DRAWINGS

To illustrate technical solutions in the embodiments of the present application more clearly, a brief introduction on the drawings which are needed in the description of the embodiments or the prior art is given below. Apparently, the drawings in the description below are merely some of the embodiments of the present application, based on which other drawings may be obtained by those of ordinary skill in the art without any creative effort.

DETAILED DESCRIPTION OF THE INVENTION

Some of terms involved in the present application are explained below to facilitate the understanding of readers:

The camera in the present application may be a normal monocular camera and may also be a binocular camera. The binocular camera is a camera formed by combining two cameras with the same parameters at a certain interval. Generally, the left camera and the right camera in the binocular camera are usually disposed on the same horizontal line, so that the optical axis of the left camera is parallel to that of the right camera. Accordingly, the binocular camera may simulate an angle difference caused by human eyes so as to achieve a stereoscopic imaging or field depth detection effect.

"A disparity value" refers to a difference value between two horizontal ordinates for the same pixel point in the two images obtained when the same target is shot by both of the left camera and the right camera in the binocular camera, that is, the disparity value of the pixel point, and correspondingly, the disparity values of all pixel points in the two images form a disparity map.

Figure 1A:
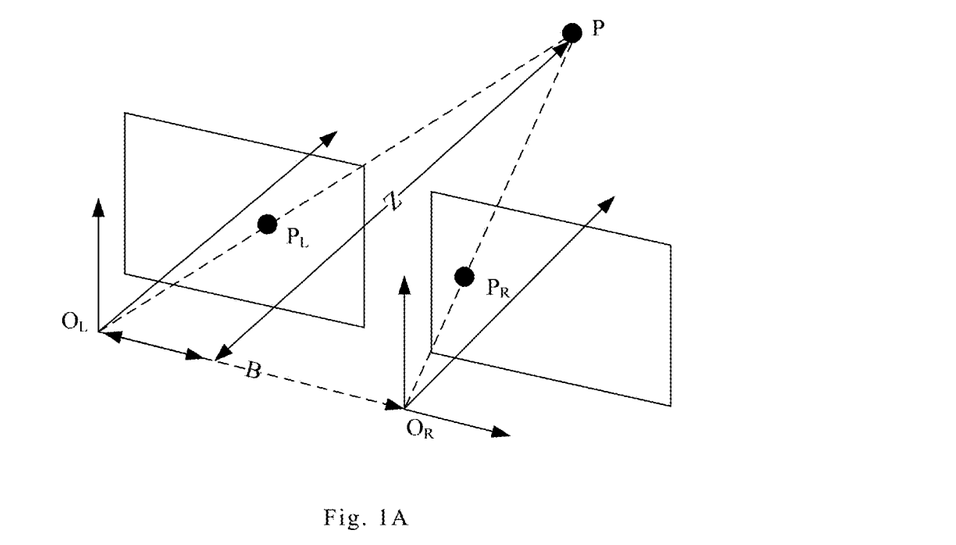
FIG. 1A is a corresponding relationship diagram of a disparity and a depth of the same object shot by a left camera and a right camera in a binocular camera provided by an embodiment of the present application.
Figure 1B:
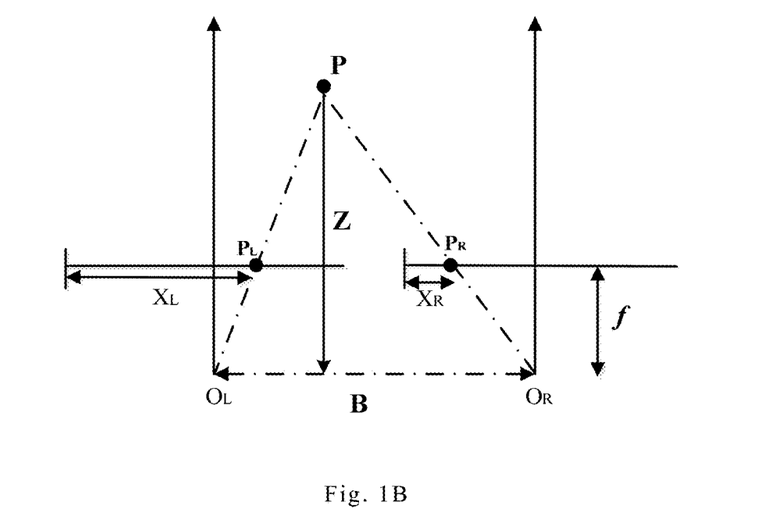
FIG. 1B is a top view of FIG. 1A.

It can be seen from the corresponding relationship diagram of the disparity and the depth shown in FIG. 1A and FIG. 1B, if $O_L$ represents the location of the left camera, $O_R$ represents the location of the right camera, f is used for representing a focal length of the lens between the left camera and the right camera, and B represents a baseline distance, which is equal to the distance between connecting lines of projection centers of the left camera and the right camera, specifically:

It is assumed that the left and right cameras view the same feature point $P(x_c, y_c, z_c)$ of a space object at the same moment. $z_c$ may generally be regarded as the depth of the feature point and is used for representing the distance between the feature point and a plane where the left and right cameras are located. The images of the feature point P are respectively obtained on a "left eye" and a "right eye", that is, the projection points of the feature point P on the left and right cameras are $P_L(x_L, y_L)$ and $P_R(x_R, y_R)$. If the images of the left and right cameras are on the same plane, then a Y coordinate of the feature point P is the same as the Y coordinates of image coordinates $P_L$ and $P_R$, it may be obtained according to a triangular geometric relationship that:

$$x_L = f \frac{x_c}{z_c}; \qquad \text{(Formula 1)}$$

$$x_R = f \frac{(x_c - B)}{z_c}; \qquad \text{(Formula 2)}$$

$$y_L = y_R = f \frac{y_c}{z_c} \qquad \text{(Formula 3)}$$

Since disparity Disparity=$x_L$-$x_R$, three-dimensional coordinates of the feature point P in a camera coordinate system may be calculated as:

$$x_c = \frac{B \times X_L}{\text{Disparity}}; \qquad \text{(Formula 4)}$$

$$y_c = \frac{B \times y_L}{\text{Disparity}}; \qquad \text{(Formula 5)}$$

$$z_c = \frac{B \times f}{\text{Disparity}}; \qquad \text{(Formula 6)}$$

Therefore, based on the above formulas, since the baseline distance B and the focal length F are determined for the binocular camera, that is, the disparity value and the depth are in an inverse relationship, so that the depth value of the pixel point may be determined by the disparity value.

It should be noted that, since the binocular camera in the present application simulates the human eyes to collect images, the left camera and the right camera in the binocular camera in the present application are disposed on the same horizontal line. The optical axes of which are parallel, and there is a certain distance between them, therefore, the disparity mentioned in the present application mainly refers to horizontal disparity.

The term "and/or" in the present context is merely an association relationship describing associated objects and indicating the presence of three relationships, for example, A and/or B, which may indicate the following three conditions: A exists separately, A and B exist at the same time, and B exists separately. In addition, the character "/" in the present context generally indicates an "or" relationship between front and back associated objects. Unless otherwise stated, "a plurality of" in the present context refers to two or more.

It should be noted that, in the embodiment of the present application, the words "exemplary" or "for example" or the like are used for meaning examples, example illustration or illustration. Any embodiment or design solution described as "exemplary" or "for example" in the embodiment of the present application should not be construed as be more preferred or advantageous than other embodiments or design solutions. Properly speaking, the words "exemplary" or "for example" or the like are intended to present related concepts in a specific manner.

It should be noted that, in the embodiment of the present application, the meaning of "a plurality of" refers to two or more unless otherwise stated.

It should be noted that, in the embodiment of the present application, "of (English: of)", "corresponding (English: corresponding, relevant)" and "corresponding (English: corresponding)" may sometimes be mixed for use. It should be noted that, when the difference is not emphasized, the meanings to be expressed for the above terms are the same.

The technical solutions in the embodiments of the present application are described below, in combination with the drawings in the embodiments of the present application. Apparently, the embodiments described below are merely a part, but not all, of the embodiments of the present application. It should be noted that some or all of the technical features in a plurality of arbitrary technical solutions provided below may be combined to form new technical solutions as long as no conflict is generated.

The executive body of the method for detection of false alarm obstacle provided by the embodiment of the present application may be an apparatus for detection of false alarm obstacle or an electronic device that may be used for executing the above method for detection of false alarm obstacle. The apparatus for detection of false alarm obstacle may be a central processing unit (Central Processing Unit, CPU), a combination of the CPU and a memory and other hardware, or may be other control units or modules in the above terminal device.

Exemplarily, the above electronic device may be a personal computer (personal computer, PC), a netbook, or a personal digital assistant (English: Personal Digital Assistant, abbreviation: PAD), a server or the like, which may analyze left and right views collected by the binocular camera by using the method provided by the embodiment of the present application, or the above electronic device may be a PC, a server or the like that is installed with a software client or a software system or a software application capable of processing the left and right views collected by the binocular camera by using the method provided by the embodiment of the present application, a specific hardware implementation environment may be a general computer form, or an ASIC form, or an FPGA form, or some programmable extension platforms such as a Xtensa platform of Tensilica and the like. For example, the above electronic device may be integrated in an unmanned aerial vehicle, a blind navigator, an unmanned vehicle, a smart phone and other devices or instruments needing to detect obstacles.

Figure 2:
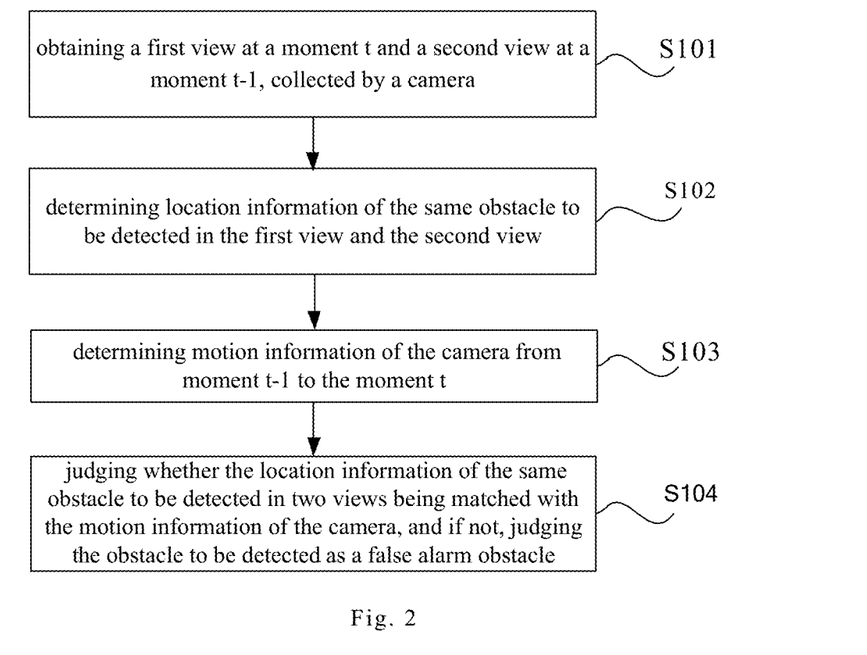
FIG. 2 is a schematic diagram of a method flow of a method for detection of false alarm obstacle provided by an embodiment of the present application.

Based on the above contents, the embodiment of the present application provides a method for detection of false alarm obstacle, and as shown in FIG. 2, the method includes the following steps:

S101. obtaining a first view at a moment t and a second view at a moment t−1, collected by a camera.

The moment t is a current moment, and the moment t−1 is a previous moment of the current moment.

The first view and the second view in the present application are images collected by the camera in a predetermined scene at the moment t and the moment t−1. Exemplarily, the first view and the second view in the present application may be 2D images, that is, may be views collected by an ordinary camera at the moment t and the moment t−1, and may also be a left view or a right view collected by a binocular camera at the moment t and the moment t−1; or, the first view and the second view in the present application may also be 3D images, that is, may be a disparity map corresponding to the left view or the right view collected by the binocular camera at the moment t and a disparity map corresponding to the left view or the right view collected by the binocular camera at the moment t−1, which is not limited herein.

S102. determining location information of the same obstacle to be detected in the first view and the second view.

S103. determining motion information of the camera from moment t−1 to the moment t.

The motion information of the camera in the present application may be motion state information of the camera from the moment t−1 to the moment t, and may also be the motion information of an object in the first view and the second view. Exemplarily, the motion information described above includes an affine matrix and a displacement matrix between adjacent frames or two frames of images spaced apart by a predetermined interval.

S104. judging whether the location information of the same obstacle to be detected in two views being matched with the motion information of the camera, and if not, judging the obstacle to be detected as a false alarm obstacle.

Optionally, on the processing of the step S104 in the present application, that is, the process of judging whether the location information of the same obstacle to be detected in two views being matched with the motion information of the camera may be implemented in the following two Implementation:

First Implementation:

In the embodiment, the motion information of the obstacle to be detected may be directly matched with the motion information of the camera to determine whether the two meet the same motion rule, so as to judge whether the location information of the obstacle to be detected in the two views being matched with the motion information of the camera.

Figure 3:
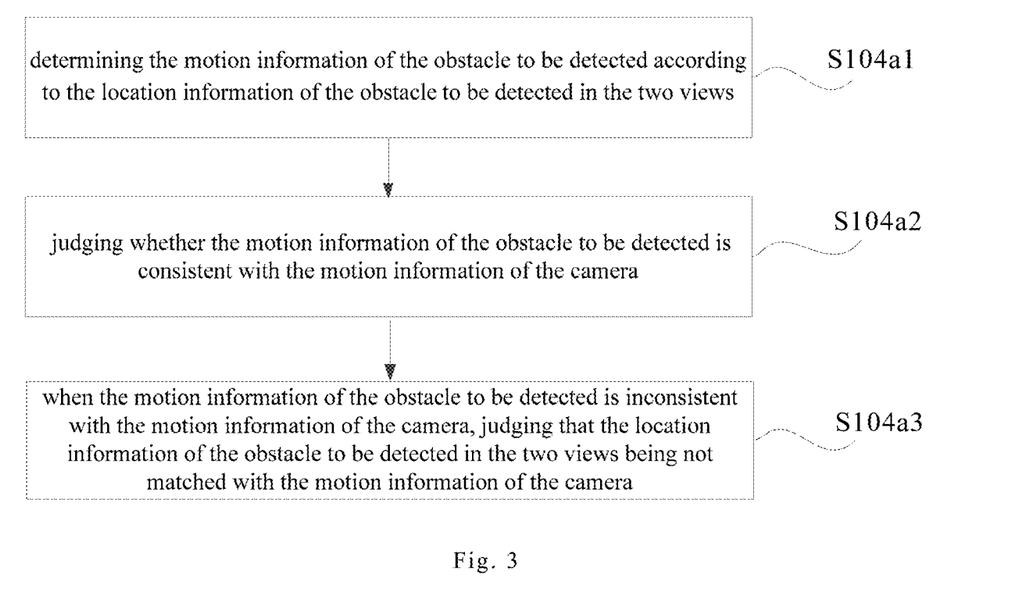
FIG. 3 is a schematic diagram of a matching flow of motion information provided by an embodiment of the present application.

Exemplarily, as shown in FIG. 3, the step S104 specifically includes the following steps:

S104a1. determining the motion information of the obstacle to be detected according to the location information of the obstacle to be detected in the two views.

S104a2. judging whether the motion information of the obstacle to be detected is consistent with the motion information of the camera.

S104a3. when the motion information of the obstacle to be detected is inconsistent with the motion information of the camera, judging that the location information of the obstacle to be detected in the two views being not matched with the motion information of the camera.

Second Implementation:

In the present implementation, the estimated location information of the obstacle to be detected at moment t may be estimated based on the motion information of the camera, thereby judging whether the estimated location information is consistent with the actual location information of the obstacle to be detected at the moment t, so as to judge whether the location information of the obstacle to be detected in the two views being matched with the motion information of the camera.

Figure 4:
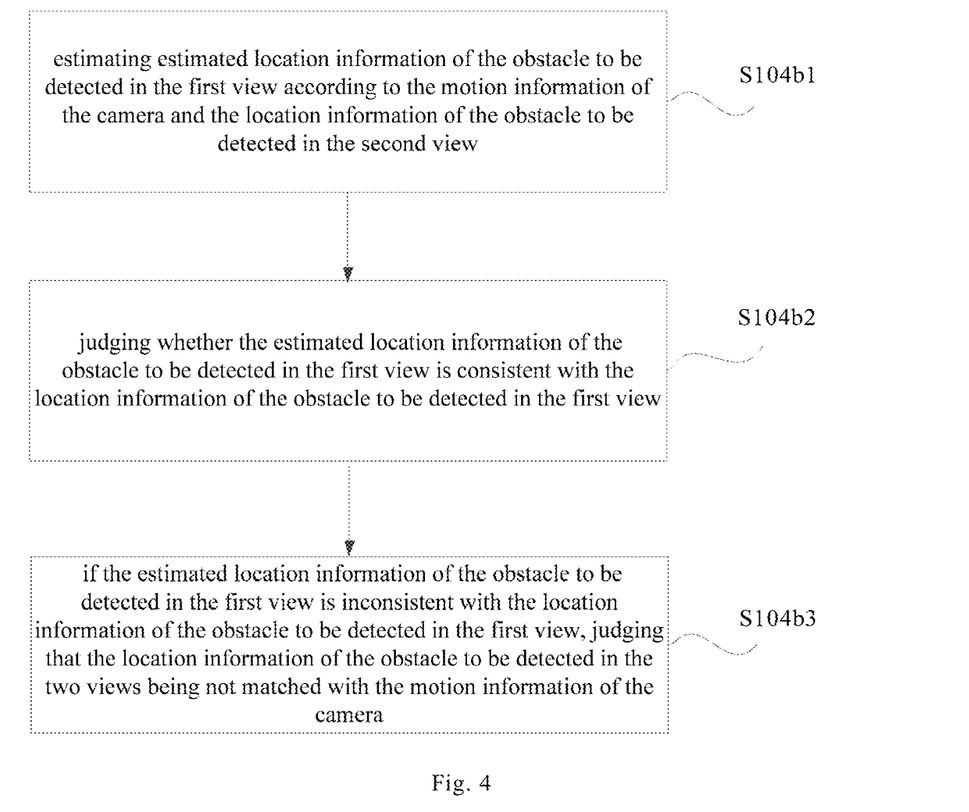
FIG. 4 is a schematic diagram of another matching flow of motion information provided by an embodiment of the present application.

Exemplarily, as shown in FIG. 4, the step S104 specifically includes the following steps:

S104b1, estimating estimated location information of the obstacle to be detected in the first view according to the motion information of the camera and the location information of the obstacle to be detected in the second view.

S104b2. judging whether the estimated location information of the obstacle to be detected in the first view is consistent with the location information of the obstacle to be detected in the first view.

S104b3. if the estimated location information of the obstacle to be detected in the first view is inconsistent with the location information of the obstacle to be detected in the first view, judging that the location information of the obstacle to be detected in the two views being not matched with the motion information of the camera.

Exemplarily, if the difference between an estimated location of the obstacle to be detected in the first view and the location of the obstacle in the first view is larger, a detection error in an area where the obstacle to be detected is located may be determined, the obstacle is a false alarm obstacle, and the location information of the obstacle to be detected is removed from a location information list of an object in the first view.

For example, at the moment t−1, a certain contour area on the second view is considered as the area of the obstacle to be detected, and a coordinate P1(x, y) of the contour area of the obstacle to be detected is determined, wherein (x, y) represents the coordinate values of a left corner in the top area of the contour; then, P1(x, y) is projected onto a corresponding location on the image at the moment t according to the motion information of the camera and is marked as P1'(x, y); a coordinate P2(x, y) of the contour area on the first view is determined; and finally, a difference value between the two coordinates P1'(x, y) and P2(x, y) is calculated so as to obtain an absolute difference value T of the two coordinates.

$$T = |P'_1(x,y) - P_2(x,y)|$$ (Formula 7)

In addition, we also set a judgment threshold value Tre, and when the calculated threshold value T>Tre, it is judged that the area of the obstacle to be detected is a false alarm area and is deleted from a contour list. Otherwise, it is judged that the area is an obstacle area on the second view. By this way, the false alarms in obstacle detection are greatly reduced.

So far, all the obstacle information corresponding to the image at the moment t are subjected to a false alarm elimination operation, and the false obstacle information are removed.

It can be seen from the above contents that, the solution may also perform motion estimation on adjacent frames or two frames of view images spaced apart by the predetermined interval, therefore the false alarm obstacles appearing in the obstacle detection may be eliminated based on the motion information, thereby improving the obstacle detection accuracy.

Figure 5A:
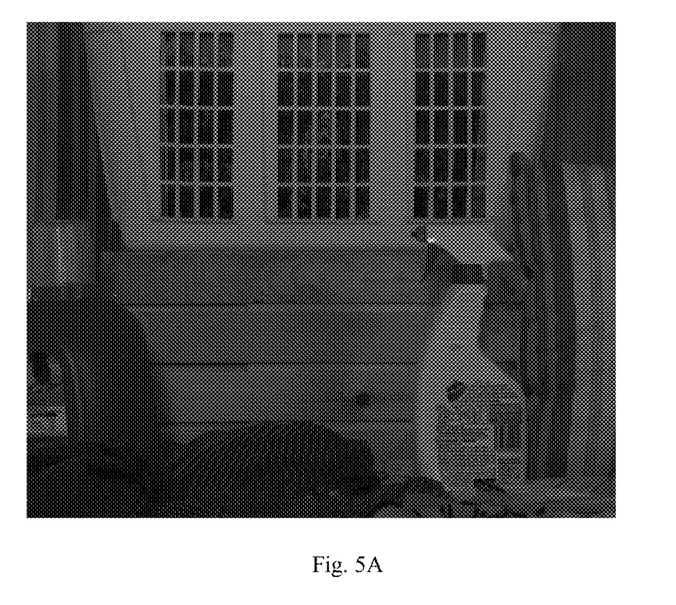
FIG. 5A is a left view obtained by the left camera when the same scene is shot by both of the left camera and the right camera in the binocular camera provided by the embodiment of the present application.
Figure 5B:
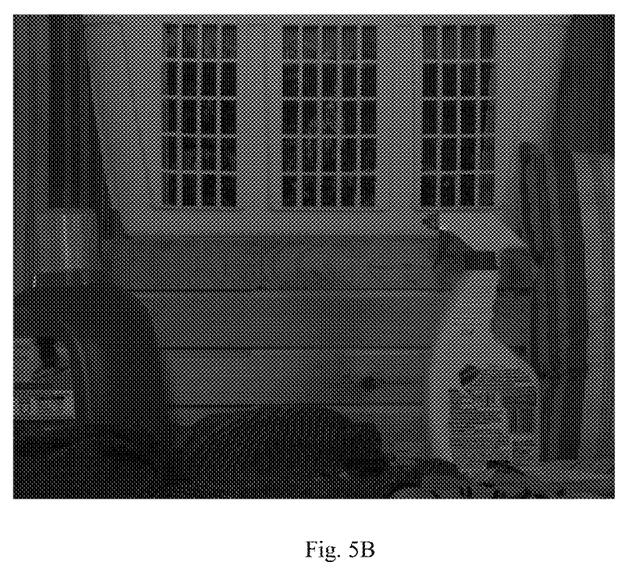
FIG. 5B is a right view obtained by the right camera when the same scene is shot by both of the left camera and the right camera in the binocular camera provided by the embodiment of the present application.
Figure 6:
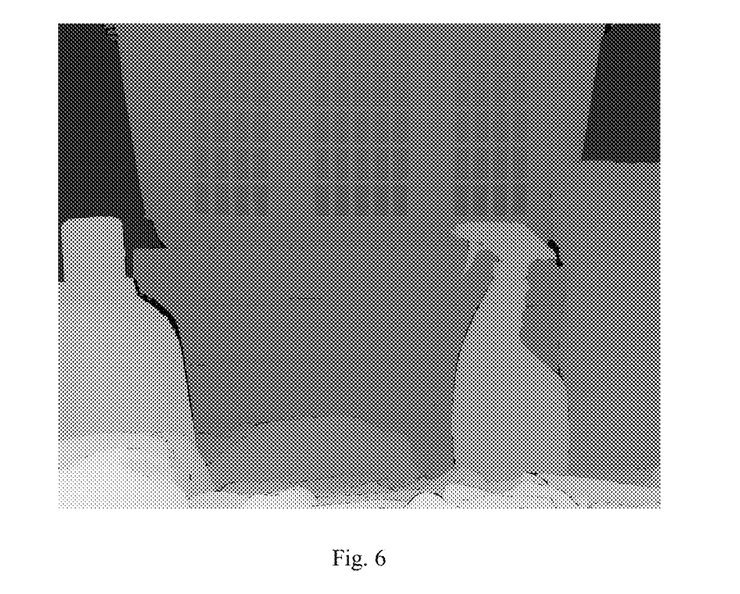
FIG. 6 is a disparity map corresponding to left and right views shown in FIG. 5.

Optionally, if the camera is a binocular camera, then the first view in the step S101 is a disparity map of the left view and the right view collected by the binocular camera at the moment t, and the second view is a disparity map of the left view and the right view collected by the binocular camera at the moment t−1. For example, FIG. 5a shows a view a as a result of a collection of a scene A by the left camera of the binocular camera at the moment t, and FIG. 5b shows a view b as a result of a collection of the scene A by the right camera of the binocular camera at the moment t, and a stereo matching is performed on the view a and the view b to obtain the corresponding disparity map c, and which may be specifically referred in FIG. 6.

Based on this, the step S103 specifically includes the following steps:

S103a. determining the motion information of the camera according to the location information of other objects except for the obstacle to be detected in the first view and the location information of the other objects in the second view.

Exemplarily, when the motion information of the camera is determined, it may be obtained by the following two examples:

First Implementation:

In the present embodiment, the motion information of the camera is estimated, by the motion information of the object shot by the camera being mainly tracked and using a common 2D image motion target tracking method (such as an optical flow method, TLD and the like). It should be noted that, in the common 2D image motion target tracking method, the motion information of the object is generally estimated based on the location information of the object on a 2D image, while the location information of the object on the 2D image usually needs to be determined according to the location information of a corresponding 3D image (e.g., a disparity map) thereof.

Exemplarily, the step S103a specifically includes the following steps:

A1. determining the location information of the other objects in a third view and the location information of the other objects in a fourth view, according to the location information of the other objects except for the obstacle to be detected in the first view and the location information of the other objects in the second view.

Wherein, the above third view is the left view corresponding to the first view, and the fourth view is the left view corresponding to the second view; or, the third view is the right view corresponding to the first view, and the fourth view is the right view corresponding to the second view.

A2: performing motion estimation on the other objects in the third view and the fourth view according to the location information of the other objects in the third view and the location information of the other objects in the fourth view, so as to obtain motion information of the camera.

In general, an estimation of 2D image motion may be roughly divided into two parts: feature point detection and feature point tracking. At present, feature point extraction algorithms which are more successful include: Harris corner detection algorithm, SUSAN algorithm and SIFT algorithm or the like. Feature point tracking matching algorithms include: KLT (Kannade-Lucas-Tomasi) algorithm. It should be noted that, since the above feature point extraction algorithms and the feature point tracking matching algorithms are relatively evolved feature point extraction algorithms. References may be incorporated in the description for the existing feature point extraction algorithms, and therefore, details related to are not described herein again.

After the feature points in a frame of image are extracted, tracking matching must be performed in subsequent images to obtain potential corresponding points.

if the KLT algorithm is taken as an example; and it is assumed that the locations of two consecutive frames of images I(x, y) and J(x, y) satisfy:

$$j(Ax+d) = 1(x)$$ (Formula 8)

It is assumed that the $$A = \begin{bmatrix} d_{11} & d_{12} \\ d_{21} & d_{22} \end{bmatrix}$$

represents a 2×2 radiation transformation matrix, $d=[d_1 d_2]$ represents as a translation matrix. In addition, It is assumed that a feature window of I(x, y) is A(x) and the feature window of J(x, y) is B(x), then:

$$\alpha = \iint_w [B(Ax+d)-A(x)]^2 w(x) \quad \text{(Formula 9)}$$

When the Formula 9 takes the minimum value, an affine matrix A and a displacement matrix d may be derived in a derivation manner.

Second Implementation:

By means of the motion information of the camera in the present embodiment, the motion state information of the camera at the moment t and the moment t−1 may be directly calculated based on a vSLAM or IMU method.

In the prior art, due to the influence of noise, errors and the like, false factors, that is, false obstacles, exist in the obstacles detected in an obstacle detection process, in order to delete the false obstacles, in the solution provided by the present application, the first view collected by the camera at the moment t and the second view by the camera at the moment t−1 are obtained. Then, the location information of the same obstacle to be detected in the first view and the second view is determined, and the motion information of the camera from moment t−1 to the moment t is also determined. Then, whether the location information of the obstacle to be detected in the two views being matched with the motion information of the camera are judged, so as to determine whether the obstacle to be detected is the false alarm obstacle. And, if the location information of the obstacle to be detected in the two views does not match the motion information of the camera, the obstacle to be detected is judged as the false alarm obstacle. Therefore the false alarm obstacle may be eliminated, and the accuracy of obstacle detection is ensured.

The embodiment of the present application provides a method for obstacle detection, which mainly calculates location information of obstacles with different depth thresholds by dividing a disparity map. It should be noted that the location information of the obstacle to be detected in the first view and the second view in the foregoing embodiment may be obtained based on the method provided by the solution.

The basic principle of the method for detection of false alarm obstacle provided by the solution is as follows: collecting respectively left and right views of the same scene by using a binocular camera; and then performing stereo matching on the collected left and right views to obtain a disparity map in the scene; performing filtering and other image preprocessing operations on the disparity map to obtain a final disparity map by removing the noise; then dividing the obtained disparity map into one or more sub-disparity maps according to different sub-disparity values range of a disparity value range of the disparity map; then performing respectively contour detection on the obtained sub-disparity maps to obtain the contour information of obstacle contours in the corresponding sub-disparity maps, and finally, calculating the size, the distance, location and other information of the obstacle in the scene based on the obtained contour information, internal and external parameters of the camera and depth information corresponding to each sub-disparity map.

The target disparity map described below is any one of the first disparity map or the second disparity map.

Figure 7:
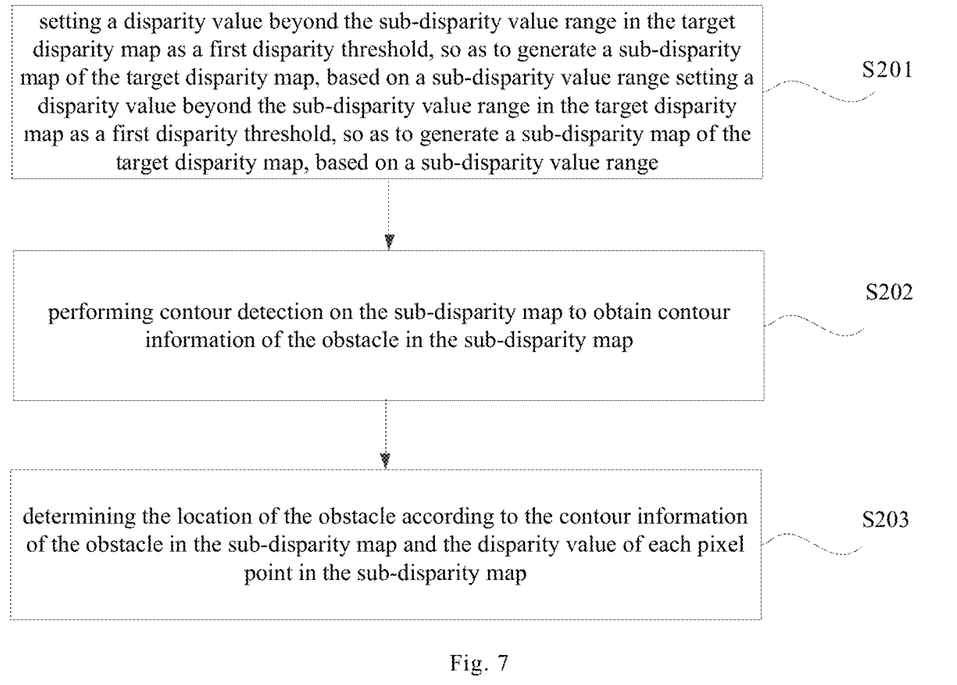
FIG. 7 is a schematic diagram of a method flow of an obstacle detection method provided by an embodiment of the present application.

Referring to FIG. 7, the method includes the following steps:

S201. setting a disparity value beyond the sub-disparity value range in the target disparity map as a first disparity threshold, so as to generate a sub-disparity map of the target disparity map, based on a sub-disparity value range divided by the disparity value range of a target disparity map.

In the embodiment of the present application, the disparity value in the sub-disparity map beyond the corresponding sub-disparity value range is the first disparity threshold, that is, the disparity value of a pixel point within the sub-disparity value range mainly represented in the sub-disparity map. Exemplarily, the predetermined disparity threshold may be set as 0 or 255. Of course, 0 or 255 is only an example, and any disparity value beyond the sub-disparity value range may be set as the disparity threshold, which is not limited herein.

It should be noted that the disparity value of the pixel point in the disparity map in the present application is the pixel value of the pixel point.

In an example, since the disparity value is inversely proportional to the depth, and in order to divide the stereoscopic scene into different distances according to the distance, the entire disparity value range of the disparity value may divided into a plurality of sub-disparity value ranges according to a certain predetermined interval threshold, and disparity maps corresponding to different sub-disparity value ranges may be further obtained.

Based on this, the division process of the disparity value range before the step S201 specifically includes the following steps:

S201a: obtaining a target disparity value range corresponding to a predetermined depth value range from the disparity value range of the first disparity map; wherein the disparity value of the pixel point in the first disparity map is inversely proportional to the depth value of the pixel point.

S201b: dividing the target disparity value range into one or more sub-disparity value ranges according to a predetermined interval threshold.

For example, it is assumed that, the distance range that the binocular camera may detect is [0.5 m, 10.5 m], and the corresponding disparity of which is [255, 0]. An object with a closer distance will generally be the focus of attention in the obstacle detection. For example, [0.5 m, 4.5 m] may be set as a detection range, that is, the predetermined depth value range is [0.5 m, 4.5 m], and the corresponding target disparity value range is [255,151]. Firstly, all values less than 161 in the disparity map are set as 0 to obtain a new disparity map D. Then, the scene within the detection range is evenly divided according to the distance at an interval of 1 m, the corresponding sub-depth value ranges are respectively [0.5 m, 1.5 m], [1.5 m, 2.5 m], [2.5 m, 3.5 m] and [3.5 m, 4.5 m], the predetermined interval threshold of the corresponding disparity value is 26, and the four corresponding sub-disparity value ranges are respectively [255, 229], [229, 203], [203, 177], and [177, 151].

Based on the step SA1 and the step SA2, if the target disparity value range in the above step SA2 is composed of one or more sub-disparity value ranges which do not overlap, that is, if the entire target disparity value range is divided into a plurality of non-overlapping sub-disparity value ranges in the step A2, the sub-disparity map corresponding to each sub-disparity value range of the first disparity map may be obtained according to the step 102.

Figure 8A:
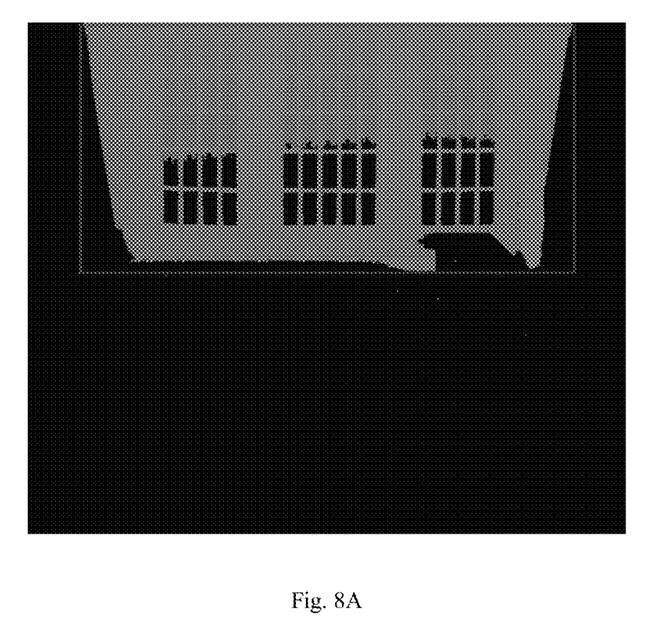
FIG. 8A is a first sub-disparity map corresponding to the disparity map shown in FIG. 6.
Figure 8B:
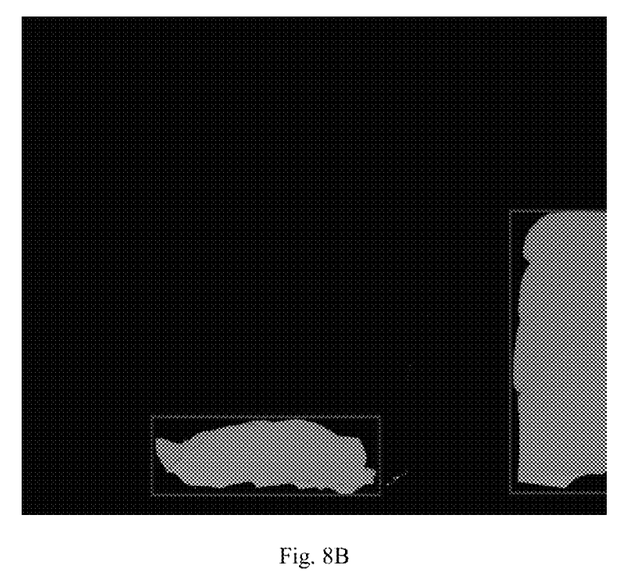
FIG. 8B is a second sub-disparity map corresponding to the disparity map shown in FIG. 6.
Figure 8C:
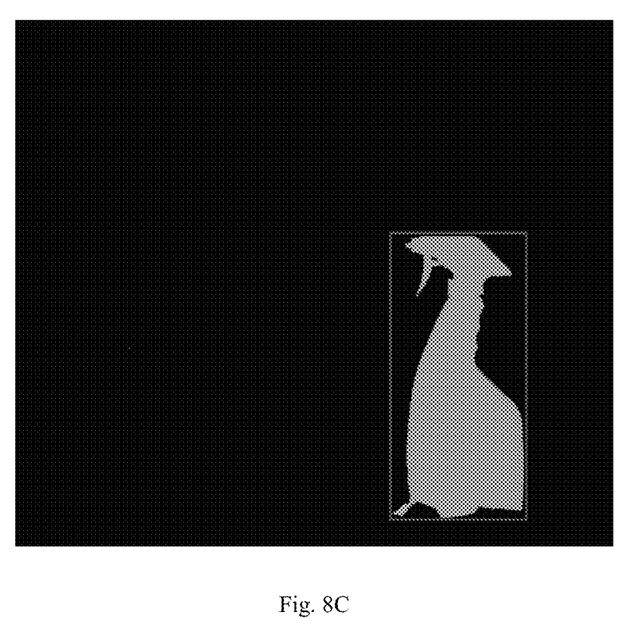
FIG. 8C is a third sub-disparity map corresponding to the disparity map shown in FIG. 6.
Figure 8D:
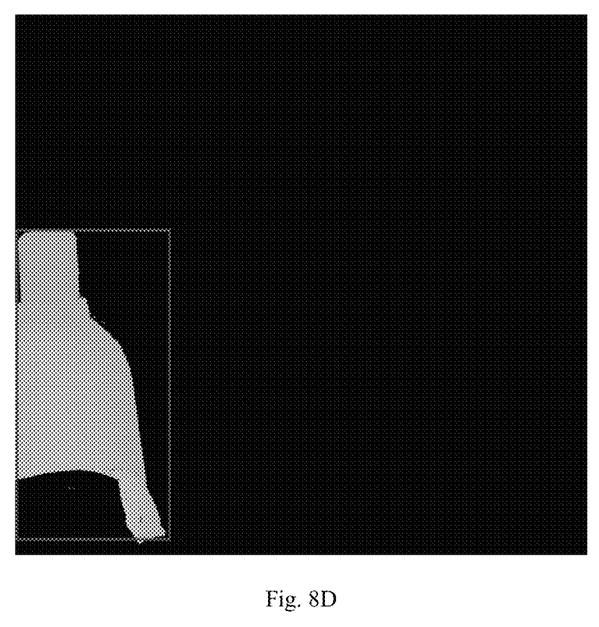
FIG. 8D is a fourth sub-disparity map corresponding to the disparity map shown in FIG. 6.

For example, it is assumed that the target disparity value range of a certain disparity value is [255, 151], the corresponding depth value range is [0.5 m, 4.5 m], which is divided into [0.5 m, 1.5 m], [1.5 m, 2.5 m], [2.5 m, 3.5 m] and [3.5 m, 4.5 m] at an interval of 1 m. The corresponding sub-disparity maps are the four sub-disparity value ranges, that is, [255, 229], [229, 203], [203, 177] and [177, 151]. The sub-disparity map corresponding to each sub-disparity value range is obtained respectively. For example, all values less than 229 in the disparity map D may be set as 0 at first, to obtain a first sub-disparity map D1; then, values less than 203 in the disparity map D is set as 0 to obtain a disparity map D1', and D1' is subtracted from the D1 to obtain a second sub-disparity map D2; then the values less than 177 in the disparity map D is set as 0 to obtain a disparity map D2', and the D2' is subtracted from the D2 to obtain a third sub-disparity map D3; and finally, the disparity map D is subtracted from the disparity map D2' to obtain a fourth sub-disparity map D4. For example, referring to the disparity map shown in FIG. 6, the sub-disparity maps of the corresponding four depth levels are respectively the first sub-disparity map shown in FIG. 8A, the second sub-disparity map shown in FIG. 8B, the third sub-disparity map shown in FIG. 8C and the fourth sub-disparity map shown in FIG. 8D.

S202. performing contour detection on the sub-disparity map to obtain contour information of the obstacle in the sub-disparity map.

In an example, if the sub-disparity maps (e.g., D1, D2, D3, and D4 described above) at different depth levels of the disparity map in the same scene are obtained according to the above example, contour detection may be performed on each sub-disparity map to obtain the contour information in each sub-disparity map, that is, the contour information of the obstacle. Exemplarily, an information format returned by each detected contour in each sub-disparity map may be defined as: {"Contour": x, y, width, height}, wherein x, y represent pixel location coordinates in the top left corner (it is only an example herein, and a top right corner, a bottom right corner, a bottom left corner and other locations may also be obtained) of the contour and respectively correspond to the located column and row; and width and height respectively represent the width and height of the contour, and units of the values of which are both pixels.

S203. determining the location of the obstacle according to the contour information of the obstacle in the sub-disparity map and the disparity value of each pixel point in the sub-disparity map.

Figure 9:
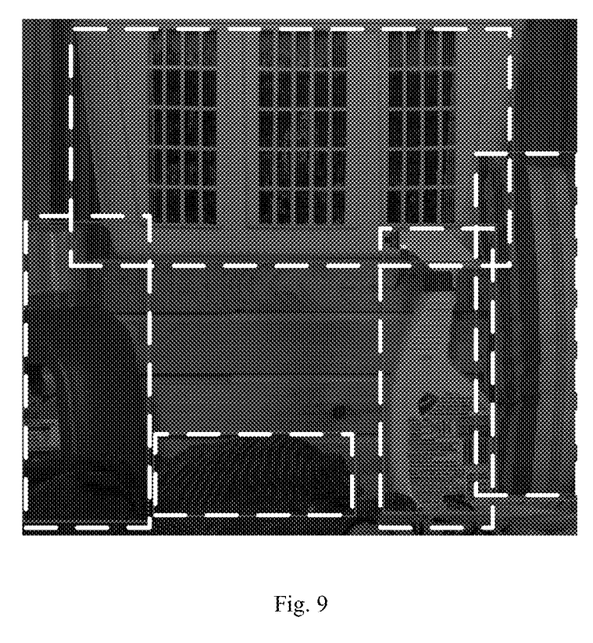
FIG. 9 is a schematic diagram of areas where obstacles are located in the disparity map shown in FIG. 6.

For example, referring to FIG. 9, if the sub-disparity maps shown in FIGS. 8A, 8B, 8C, and 8D are taken as an example, the contour detection is performed on the four images respectively to obtain obstacle information corresponding to each depth, and the specific obstacle location is shown in FIG. 9.

In an example, when the location information of the obstacle in a certain sub-disparity map is calculated specifically, some location, size and distance information of the obstacle in the scene may be easily calculated based on the coordinate and size information of different contours obtained in the step S103, the parameters of a binocular system, and a dense disparity map D obtained above.

For example, taking a certain contour C as an example, the coordinates of the top left corner thereof are $$(x_0, y_0)\left(x_0 + \frac{w_0}{2}, y_0 + \frac{h_0}{2}\right),$$

the width thereof is w0, and the height thereof is h0. Furthermore, images coordinates $(x_0+w_0, y_0)$ and $$\left(x_0 + \frac{w_0}{2}, y_0 + \frac{h_0}{2}\right)$$

of a top right corner and the center of the contour may be obtained. Firstly, according to the Formula 6:

$$z_c = \frac{B \times f}{\text{Disparity}};$$

the disparity value of each point is derived from the disparity map according to the image coordinates, and then the distances Z0, Z1, and Z' between the scenes corresponding to the top left corner, the top right corner and the central location of the contour and binocular camera may be obtained. According to the Formula 7: $[u,v,1]^T = P[X,Y,Z,1]^T$ (a projection relationship between an object point and an image point), the coordinates $(X_0,Y_0,Z_0)$ and $(X_1,Y_1,Z_1)$ of the top left corner and the top right corner of the contour in a world coordinate system may be respectively calculated, that is, the coordinates of actual object points corresponding to the top left corner and the top right corner of the contour. So far, object information in the contour are all obtained and are defined as {"Obstacle": $X_L$, $X_R$, Width, Height, Distance}, wherein $X_L$ represents a lateral distance of the leftmost side from the obstacle to the camera, and $X_L=X_0$; $X_R$ represents the lateral distance from the rightmost side of the obstacle to the camera, and $X_R=X_1$; Width represents the width of the obstacle, Width=$X_1-X_0$; Height represents the height of the obstacle, Height=$Y_0-Y_1$; and Distance represents the axial distance from the obstacle to the left and right cameras, Distance=$Z'$. Furthermore, all obstacle information required for obstacle avoidance is obtained.

Since the disparity value of the pixel point in the disparity map is inversely proportional to the depth of the pixel point, the sub-disparity maps of different depth ranges of the disparity map corresponding to the left and right views in the same scene collected by the binocular camera may be obtained according to the disparity value of each pixel point in the disparity map corresponding to the left and right views collected by the binocular camera, and contour detection is performed on the sub-disparity maps of different depth levels to determine the locations of obstacles of different depth levels based on the contour information of the contours at different depth levels, thereby a relative distance between the obstacle and the binocular camera is accurately positioned. In the solution, simple division is performed on the disparity map to perform contour detection on sub-disparity maps of different depths, thereby not only shortening the detection time, but also improving the detection precision.

It should be noted that, before a controlling of the binocular camera to collect the left view and the right view, it is usually necessary to perform certain adjustment (for example, camera adjustment operations such as offline calibration and image correction) for the binocular camera in advance to ensure that the optical axis of the left camera is parallel to that of the right camera. Then, a baseline length between the optical axis of the left camera and the optical axis of the right camera is measured, the focal length of the binocular camera is recorded, and the baseline length and focal length are ensured to be unchanged, thereby ensuring the synchronization of the images acquired by the binocular camera and avoiding unnecessary errors.

1) Camera Calibration

The camera calibration in the present application generally refers to offline calibration for camera. Generally, since the optical axis of the binocular camera is located inside the camera, it is difficult to ensure that the optical axes are strictly parallel when the camera is assembled. Generally, there is a certain deviation. Therefore, offline calibration may be generally performed on the successfully constructed binocular camera to obtain the internal parameters (focal length, baseline length, image center, distortion parameters and the like) and external parameters (rotation matrix R and translation matrix T) of the camera.

In one example, the offline calibration is performed on the lens of the binocular camera by using the Zhang Zhengyou checkerboard calibration method.

When the offline calibration is performed on the camera, the left camera can be calibrated firstly to obtain the internal and external parameters of the left camera; secondly, the right camera is calibrated to obtain the internal and external parameters of the right camera; and finally, the binocular camera is calibrated to obtain a rotational translation relationship between the left and right cameras.

Assuming that there is a point $W=[X,Y,Z]^T$ in the world coordinate system, the corresponding point of the point on an image plane is $m=[u,v]^T$, then the projection relationship between the object point and the image point is:

$$[u,v,1]^T = P[X,Y,Z,1]^T \quad \text{(Formula 10);}$$

Wherein P represents a 3×4 projection matrix, which may be represented by a rotation and translation matrix:

$$P=A[Rt] \quad \text{(Formula 11);}$$

Wherein R represents a 3×3 rotation matrix and t represents a translation vector, the two matrices represent the external parameters of binocular vision, wherein one represents location and the other represents direction. In this way, the location of each pixel point on the image in the world coordinate system may be determined. Wherein a matrix represents an internal parameter matrix of the camera and may be expressed as follows:

$$A = \begin{pmatrix} f_u & \beta & u_0 \\ 0 & f_v & v_0 \\ 0 & 0 & 1 \end{pmatrix}.$$

In the above formula, $(u_o, v_o)$ represents the coordinate of the center point of the image; $f_u$ and $f_v$ respectively represent the focal length represented by horizontal and vertical pixel units, and $\beta$ represents a tilt factor.

Some parameters obtained in the above offline calibration process are applied to both image correction and obstacle calculation processes.

2) Image Correction

Since the lens distortion causes distortion to an image collected by the lens, distortion correction and polar line correction may be generally performed on the binocular camera before the binocular camera collects images. Assuming that an undistorted reference image is f(x, y) and the image with larger geometric distortion is g(x', y'), the set distortion between coordinate systems for the two images may be expressed as:

$$\begin{cases} x' = h_1(x, y) \\ y' = h_2(x, y) \end{cases};$$

and the above formula is expressed by a binary polynomial:

$$x' = \sum_{i=0}^{n} \sum_{j=0}^{n=i} a_{ij} x^i y^j \quad \text{(Formula 12)}$$

$$y' = \sum_{i=0}^{n} \sum_{j=0}^{n=i} b_{ij} x^i y^j;$$

Wherein n represents the coefficient of the polynomial, i and j represent the specific locations of the pixel points in the image, and $a_{ij}$ and $b_{ij}$ represent various coefficients. An image subject to distortion correction is obtained by the above formula.

A polar line correction operation of the image is based on the rotation and translation matrices of the left and right cameras obtained in the offline camera correction. It is assumed that the rotation and translation matrices of the left camera are R1 and t1, and the rotation and translation matrices of the right camera are R2 and t2, and the rotation and translation matrices may be obtained during the offline correction. Based on the rotation and translation matrices of the left and right cameras, polar lines corresponding to the images of the left and right cameras are parallel to each other by using a Bouguet polar line correction method. The time complexity of stereo matching is greatly reduced, and the disparity calculation process is simplified.

The solution provided by the embodiment of the present application is mainly introduced from the perspective of the apparatus for detection of false alarm obstacle and the terminal used by the apparatus. It may be understood that the apparatus includes corresponding hardware structures and/or software modules for performing various functions, in order to implement the above functions. Those skilled in the art will readily appreciate that the present application may be implemented by hardware or a combination of hardware and computer software, in combination with the units and algorithm steps of the various examples described in the embodiments disclosed herein. Whether a certain function is implemented in the form of hardware or a driven hardware by the computer software is determined by specific applications and designed constraint conditions of the technical solutions. Those skilled in the art may implement the described functions by using different methods for each specific application, but this implementation should not be considered beyond the scope of the present application.

In the embodiment of the present application, the function modules of the apparatus for detection of false alarm obstacle may be divided according to the above method example. For example, the function modules may be divided according to the corresponding functions, and two or more functions may also be integrated into one processing module. The above integrated module may be implemented in the form of hardware and may also be implemented in the form of a software function module. It should be noted that the division of the modules in the embodiment of the present application is schematic and is only a logical function division, and other division manners may be provided during the actual implementation.

The apparatus embodiment provided by the embodiment of the present application, corresponding to the method embodiment provided above, is described below. It should be noted that the explanation of related contents in the following apparatus embodiment may refer to the foregoing method embodiment.

Figure 10:
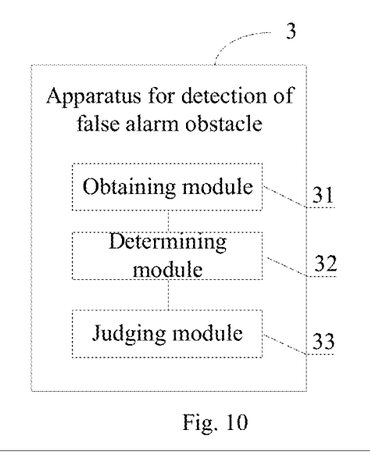
FIG. 10 is a structural schematic diagram of an apparatus for detection of false alarm obstacle provided by an embodiment of the present application.

In the case that the function modules are divided according to the corresponding functions, FIG. 10 shows a possible structural schematic diagram of the apparatus for detection of false alarm obstacle involved in the above embodiment. The apparatus 4 includes: an obtaining module 31, a determining module 32 and a judging module 33. The obtaining module 31 is configured to support the apparatus for detection of false alarm obstacle to execute the process S101 in FIG. 2; the determining module 32 is configured to support the apparatus for detection of false alarm obstacle to execute the processes S102 and S103 in FIG. 2; and the judging module 33 is configured to support the apparatus for detection of false alarm obstacle to execute the process S104 in FIG. 2. Further, the judging module 33 is specifically configured to support the apparatus to execute the processes SA1, S104a-S104a3 in FIG. 3. Further, the judging module 33 is specifically configured to support the apparatus to execute the processes S104b1-S104b3 in FIG. 4. Further, the determining module 32 is further configured to support the apparatus to execute the steps S201-S203 in FIG. 7. Further, the determining module 32 is further configured to support the apparatus to execute the step S103a in the above context. All the related contents of the steps involved in the foregoing method embodiment may be quoted to the function descriptions of the corresponding function modules, and thus details are not described herein again.

In hardware implementation, the obtaining module 31, the determining module 32 and the determining module 33 may be processors. The programs corresponding to the actions executed by the apparatus for detection of false alarm obstacle described above may be stored in a memory of the apparatus in the form of software, so that the processor loads and execute the operations corresponding to the above respective modules.

Figure 11:
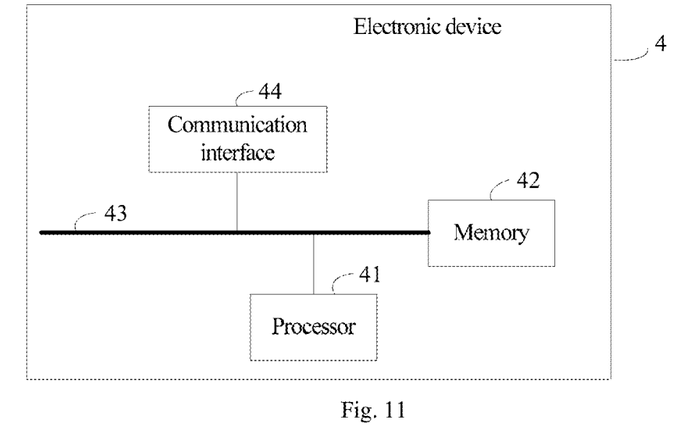
FIG. 11 is a structural schematic diagram of an electronic device provided by an embodiment of the present application.

FIG. 11 shows a possible structural schematic diagram of an electronic device involved in the embodiment of the present application. The apparatus 4 includes a processor 41, a memory 42, a system bus 43 and a communication interface 44. The memory 42 is configured to store computer execution codes; the processor 41 is connected with the memory 42 through the system bus 43. When the apparatus is running, the processor 41 is configured to execute the computer execution codes stored in the memory 42 to execute any method for detection of false alarm obstacle provided by the embodiment of the present application, for example, the processor 41 is configured to support the apparatus to execute all steps in FIG. 3, and/or applied to other processes of the technology described herein, the specific false alarm obstacle detection method may be referred to related descriptions below and in the drawings, and thus are not described herein again.

The embodiment of the present application further provides a storage medium, which may include a memory 42.

The embodiment of the present application further provides a computer program, the computer program may be directly loaded into the memory 42 and contains software codes, and the computer program may implement the above method for detection of false alarm obstacle after being loaded and executed by a computer.

The processor 41 may be a single processor and may also be a unit name of a plurality of processing elements. For example, the processor 41 may be a central processing unit (central processing unit, CPU). The processor 41 may also be other general purpose processors, a digital signal processor (digital signal processor, DSP), an application specific integrated circuit (application specific integrated circuit, ASIC), a field-programmable gate array (field-programmable gate array, FPGA) or other programmable logic devices, discrete gates or transistor logic devices, discrete hardware components and the like, and the processor may implement or execute logic boxes, modules and circuits of various examples described in combination with the contents disclosed by the present application. The general purpose processor may be a microprocessor or the processor may also be any conventional processor or the like. The processor 41 may also be a dedicated processor, and the dedicated processor may include at least one of a baseband processing chip, a radio frequency processing chip and the like. The processor may also be a combination for implementing a computing function, for example, a combination including one or more microprocessors, a combination of a DSP and a microprocessor, and the like. Further, the dedicated processor may further include a chip having other dedicated processing functions of the apparatus.

The steps of the method described in combination with the contents disclosed by the present application may be implemented in the form of hardware and may also be implemented by a processor executing software instructions. The software instruction may be composed of corresponding software modules, and the software modules may be stored in a random access memory (English: random access memory, abbreviation: RAM), a flash memory, a read only memory (English: read only memory, abbreviation: ROM), an erasable programmable read-only memory (English: erasable programmable ROM, abbreviation: EPROM), an electrically erasable programmable read-only memory (English: electrical EPROM, abbreviation: EEPROM), a register, a hard disk, a mobile hard disk, a CD-ROM (CD-ROM) or any other form of storage medium known in the art. An exemplary storage medium is coupled to the processor, so that the processor may read information from and write information to the storage medium. Of course, the storage medium may also be a constituent part of the processor. The processor and the storage medium may be located in an ASIC. Additionally, the ASIC may be located in a terminal device. Of course, the processor and the storage medium may also exist as discrete components in the terminal device.

The system bus 43 may include a data bus, a power bus, a control bus and a signal state bus and the like. For the sake of clarity in the present embodiment, various buses are illustrated as the system bus 43 in FIG. 11.

The communication interface 44 may specifically be a transceiver on the apparatus. The transceiver may be a wireless transceiver. For example, the wireless transceiver may be an antenna or the like of the apparatus. The processor 41 communicates with other devices via the communication interface 44. For example, if the apparatus is a module or component in the terminal device, the apparatus is applied to the data interaction with other modules in the electronic device.

The embodiment of the present application further provides a robot, including the apparatus for detection of false alarm obstacle corresponding FIG. 10 and FIG. 11.

Those skilled in the art should be aware that, in one or more examples described above, the functions described in the present application may be implemented by hardware, software, firmware, or any combination thereof. When implemented by the software, these functions may be stored in a computer readable medium or transmitted as one or more instructions or codes on the computer readable medium. The computer readable medium includes a computer storage medium and a communication medium, wherein the communication medium includes any medium that may conveniently transfer the computer programs from one place to another. The storage medium may be any available medium that may be accessed by a general purpose or special purpose computer.

Finally, it should be noted that, the objects, technical solutions and beneficial effects of the present application have been further illustrated in detail by the above specific embodiments. It should be understood that the foregoing descriptions are merely specific embodiments of the present application, but the protection scope of the present application is not limited thereto. Any modifications, equivalent substitutions and improvement and the like made on the basis of the technical solutions of the present application shall fall within the protection scope of the present application.

The invention claimed is:

1. A method for detection of false alarm obstacle, comprising:
obtaining a first view at a moment t and a second view at a moment t−1, collected by a binocular camera, wherein the first view is a disparity map from the left view and the right view collected by the binocular camera at the moment t; and the second view is a disparity map from the left view and the right view collected by the binocular camera at the moment t−1;
determining location information of the same obstacle to be detected in the first view and the second view;
determining motion information of the binocular camera from moment t−1 to the moment t;
judging whether the location information of the same obstacle to be detected in two views being matched with the motion information of the binocular camera; and
if not, judging the obstacle to be detected as a false alarm obstacle;
wherein said determining location information of the same obstacle to be detected in the first view and the second view comprises:
specifying the first view and the second view as a target view in turn;
based on a sub-disparity value range divided from a disparity value range of the target view, setting a disparity value beyond the sub-disparity value range in the target view as a first disparity threshold, so as to generate a sub-view of the target view;
performing contour detection on the sub-view to obtain contour information of the obstacle to be detected in the sub-view; and
determining the location information of the obstacle to be detected according to the contour information of the obstacle to be detected and the disparity value of each pixel point in the sub-disparity map.

2. The method according to claim 1, wherein,
said judging whether the location information of the same obstacle to be detected in two views being matched with the motion information of the binocular camera comprises:
determining the motion information of the obstacle to be detected according to the location information of the obstacle to be detected in the two views;
judging whether the motion information of the obstacle to be detected is consistent with the motion information of the binocular camera; and
when the motion information of the obstacle to be detected is inconsistent with the motion information of the binocular camera, judging that the location information of the same obstacle to be detected in the two views being not matched with the motion information of the camera.

3. The method according to claim 1, wherein said judging whether the location information of the same obstacle to be detected in two views being matched with the motion information of the binocular camera comprises:
estimating estimated location information of the obstacle to be detected in the first view, according to the motion information of the binocular camera and the location information of the obstacle to be detected in the second view;
judging whether the estimated location information of the obstacle to be detected in the first view is consistent with the location information of the obstacle to be detected in the first view; and
if the estimated location information of the obstacle to be detected in the first view is inconsistent with the location information of the obstacle to be detected in the first view, judging that the location information of the obstacle to be detected in the two views being not matched with the motion information of the binocular camera.

4. The method according to claim 2, wherein
said determining motion information of the binocular camera from moment t−1 to the moment t comprises:
determining the motion information of the binocular camera according to the location information of other objects except for the obstacle to be detected in the first view and the location information of the other objects in the second view.

5. An electronic device, wherein the electronic device comprises a memory and a processor, the memory is coupled in the processor and is configured to store computer software codes, and the computer software codes are configured to control the processor to execute the method according to claim 1.

6. A non-transitory computer storage medium, for storing computer software instructions used by the apparatus for detection of false alarm obstacle and containing program codes designed to execute the method according to claim 1.

* * * * *